United States Patent
Omura (10) Patent No.: US 6,618,577 B2
(45) Date of Patent: Sep. 9, 2003

(54) SHEET GUIDING DEVICE WITH ELECTROMAGNETIC SHIELD PLATE SERVING AS ONE GUIDE SURFACE AND IMAGE FORMING APPARATUS INCLUDING THE SAME

(75) Inventor: Kinya Omura, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/078,463

(22) Filed: Feb. 21, 2002

(65) Prior Publication Data

US 2002/0127038 A1 Sep. 12, 2002

(30) Foreign Application Priority Data

Mar. 9, 2001 (JP) ........................... 2001-067380

(51) Int. Cl.[7] ............................. G03G 15/00; B65H 5/00
(52) U.S. Cl. .................... 399/401; 271/301; 271/902
(58) Field of Search ..................... 399/107, 401, 399/329; 271/225, 301, 902

(56) References Cited

U.S. PATENT DOCUMENTS

| | | | | |
|---|---|---|---|---|
| 5,752,148 A | * | 5/1998 | Yoneda et al. | 399/329 |
| 5,953,575 A | * | 9/1999 | Park et al. | 399/401 |
| 5,974,283 A | * | 10/1999 | Cho | 399/401 X |
| 6,415,118 B1 | * | 7/2002 | Setoriyama et al. | 399/107 X |
| 6,526,255 B2 | * | 2/2003 | Itoh et al. | 399/401 |

FOREIGN PATENT DOCUMENTS

| | | | |
|---|---|---|---|
| JP | 11-38716 | * | 2/1999 |
| JP | 11-186767 | * | 7/1999 |

* cited by examiner

*Primary Examiner*—Fred L Braun
(74) *Attorney, Agent, or Firm*—Fitzpatrick, Cella, Harper & Scinto (57) ABSTRACT

A sheet guiding device has an electromagnetic shield plate disposed between a re-transportation path for a sheet material and a video controller board, with the bottom surface of the electromagnetic shield plate being used as a sheet guiding surface and a portion of the sheet guiding surface protruding towards the re-transportation path to form a guiding section made of metal and integrally formed with the electromagnetic shield plate.

17 Claims, 5 Drawing Sheets

SHEET GUIDING DEVICE WITH ELECTROMAGNETIC SHIELD PLATE SERVING AS ONE GUIDE SURFACE AND IMAGE FORMING APPARATUS INCLUDING THE SAME

BACKGROUND OF THE INVENTION

1. Field of the Invention

The present invention relates to sheet guiding means used for guiding transportation of a sheet material in, for example, a printer, a copying machine, or a facsimile, and an image forming apparatus including the same.

2. Description of the Related Art

Figure 5:
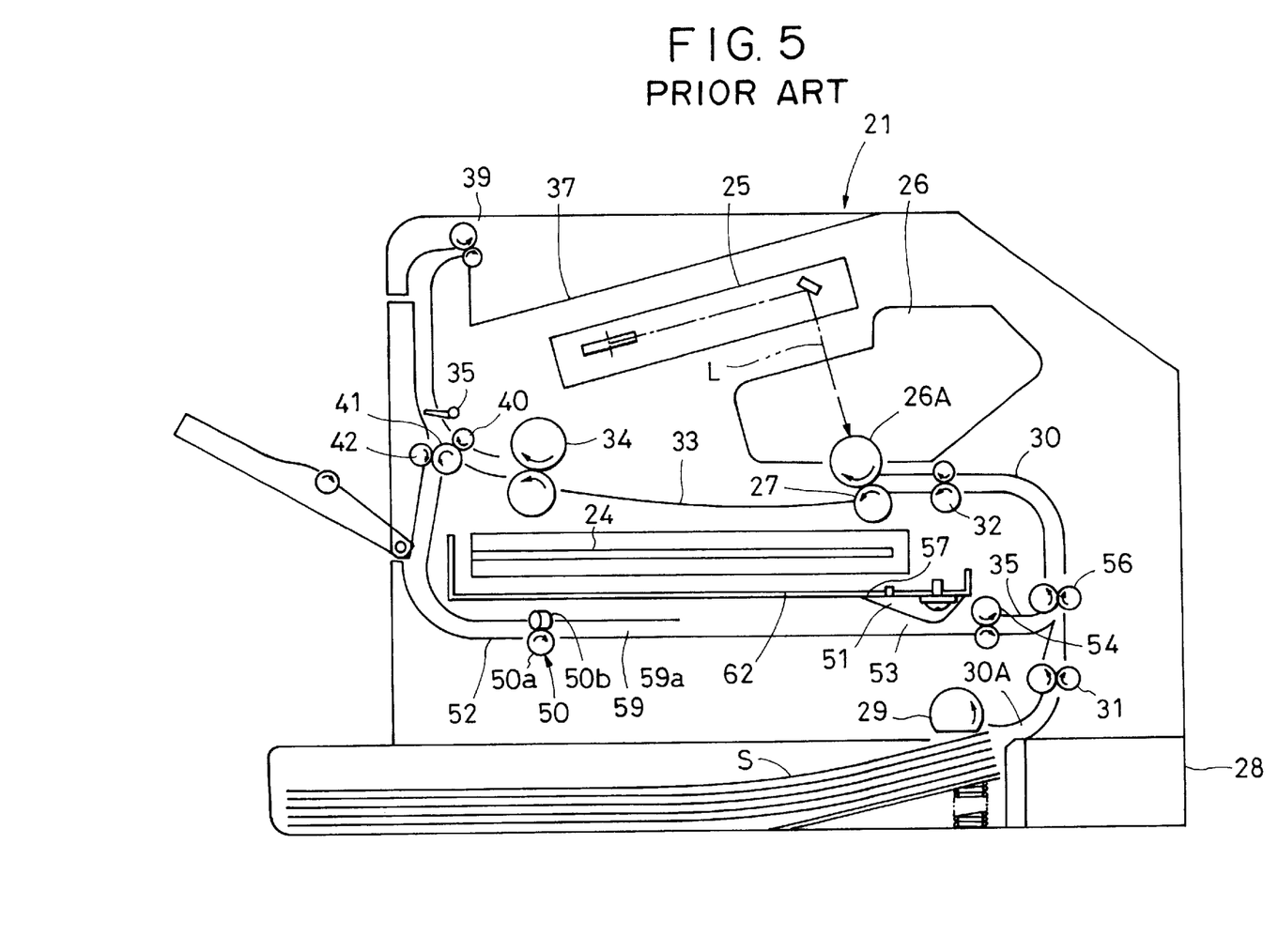
FIG. 5 is a vertical sectional view schematically showing the structure of a related image forming apparatus.

A structure of a laser beam printer is schematically shown in FIG. 5 as a structure of a related image forming apparatus.

In the laser beam printer (image forming apparatus) shown in FIG. 5, when a sheet material S passes through a transfer nip section between a photosensitive drum 26A and a transfer roller 27, a toner image which has been formed on the photosensitive drum 26A by image formation processes, such as a charging operation, an exposure operation, and a developing operation, is transferred onto the sheet material S. Sheet material S, which may be paper, has been fed from a sheet-feed cassette 28, disposed at the bottom portion of the body of the image forming apparatus. After the toner image has been transferred onto the sheet material S, the toner image is fixed to the surface of the sheet material S by a fixing device 34. Here, when a one-side image formation mode is selected by an input operation from an operation panel (not shown), the sheet material S onto which the toner image has been transferred is discharged onto a sheet-discharge tray 37, disposed at the top portion of the image forming apparatus, thereby completing the formation of the image on one side of the sheet material S.

On the other hand, when a duplex image formation mode is selected, after the toner image has been fixed to one surface (a first surface) of the sheet material S, the sheet material S is not discharged onto the sheet-discharge tray 37, disposed above the sheet material S, but, is, instead, transported to a sheet re-feed path 52, disposed below the sheet material S.

The sheet material S which has been transported to the sheet re-feed path 52 is obliquely transported into a re-transportation path 59 by a transporting roller 50a and a diagonal-feed roller 50b. At this time, by bringing one of the edges (in the horizontal direction) of the sheet material S into contact with an oblique-movement correcting guide (not shown), oblique movement of the sheet material S in the horizontal direction is corrected. An electromagnetic shield plate 62 is disposed above the re-transportation path 59 and between the re-transportation path 59 and an electrical member 24. The bottom surface of the electromagnetic shield plate 62 restricts the position of the top portion of the sheet material S that is moving in the re-transportation path 59. A guiding member 51 is fixed to the downstream-side portion of the electromagnetic shield plate 62. The guiding member 51 forms what is called a restrictor portion which protrudes into the re-transportation path 59 in order to limit, from the vertical direction, the directional position of the re-transportation path 59.

The sheet material S is supplied to a downstream-side sheet re-feed roller 54 as a result of passing through the re-transportation path 59. The oblique movement of the supplied sheet material S is corrected by the oblique-movement correcting guide. In addition, for example, even when the supplied sheet material S is curled upward after the fixing operation, the front edge of the supplied sheet material S is smoothly guided to a nip section at the sheet re-feed roller 54 by the guiding member 51.

Of the labeled component parts in FIG. 5, those that are not described are similar to corresponding component parts shown in FIG. 1, which illustrates a first embodiment (described later). Therefore, they will be described later with reference to FIG. 1.

The electromagnetic shield plate 62, shown in FIG. 5, is, in general, formed of metal. Conventionally, the guiding member 51 has been a synthetic resin member secured to the electromagnetic shield plate 62.

Separately forming the guiding member 51 and the electromagnetic shield plate 62 results in additional costs of component parts and creation of manhours for performing mounting, which are, undoubtedly, disadvantageous from the viewpoint of costs. In addition, a parts gap 57 may be formed between the electromagnetic shield plate 62 and the guiding member 51 due to, for example, variations in the dimensions of the parts. This may result in the front edge of the sheet material S getting stuck and, thus, jammed in the parts gap 57.

In particular, when the guiding member 51 is a resin member, it tends to wear and to get scraped when an edge of the sheet material S collides therewith, so that the sheet material S catches in the worn and scraped portion of the guiding member 51. Therefore, due to this reason also, jamming tends to occur. Further, since the sheet material S rubs against the guiding member 51, triboelectricity tends to occur. This may prevent smooth transportation of the sheet material S.

Although, in the foregoing description, the problems of increased costs, jamming, and improper transportation of the sheet material S are described as occurring in the re-transportation path, these problems may also occur in other commonly provided transportation paths.

SUMMARY OF THE INVENTION

In view of the above-described circumstances, it is an object of the present invention to provide sheet guiding means which makes it possible to prevent increased costs and improper transportation, including jamming, of sheets, and to provide an image forming apparatus including such sheet guiding means.

To this end, according to one aspect of the present invention, there is provided a sheet guiding device for guiding a sheet material. The sheet guiding device comprises an electromagnetic shield plate which is disposed between an electrical member and a sheet transportation path. In the sheet guiding device, by disposing the electromagnetic shield plate along the sheet transportation path, a sheet-transportation-path-side surface of the electromagnetic shield plate is used as a sheet guiding surface for guiding the sheet material through a guiding section. In addition, in the sheet guiding device, a portion of the electromagnetic shield plate protrudes into the sheet transportation path in order to form the protruding portion of the electromagnetic shield plate and thereby narrow the sheet transportation path in a vertical direction.

According to one aspect of the present invention, the electromagnetic shield plate is disposed at a sheet re-feed path for the sheet material, and the sheet material which is re-fed is guided by the guiding section.

In accordance with this aspect, the electromagnetic shield plate may be disposed above the sheet transportation path so that the sheet guiding surface restricts the sheet material which is transported in the sheet transportation path, from above the sheet material.

In accordance with another aspect of the invention, the sheet guiding device further comprises an oblique movement correcting guide which corrects an oblique movement of the sheet material by coming into contact with one of the edges, in a horizontal direction, of the sheet material which is being transported, wherein a guide length of the guide section and a guide length of the oblique movement correcting guide are set substantially equal to each other.

In accordance with this aspect of the invention, a height of the bottommost portion of the guide section and a height of the topmost portion of the oblique movement correcting guide are set substantially equal to each other.

According to still another aspect of the present invention, there is provided an image forming apparatus comprising an image forming section which forms an image on a surface of a sheet material which has been supplied, and a sheet transportation path used to guide the sheet material when the sheet material is supplied to the image forming section and after the image has been formed on the sheet material. In the image forming apparatus, the sheet guiding device of any one of the one aspect to the fourth form of the one aspect is provided at a portion of the sheet transportation path.

Further objects, features and advantages of the present invention will become apparent from the following description of the preferred embodiments with reference to the attached drawings.

DESCRIPTION OF THE PREFERRED EMBODIMENTS

A description of embodiments of the present invention will now be given with reference to the drawings. Component parts given the same reference numerals in each of the figures have the same structures or functions. Descriptions of the corresponding component parts will not be repeated.

Figure 1:
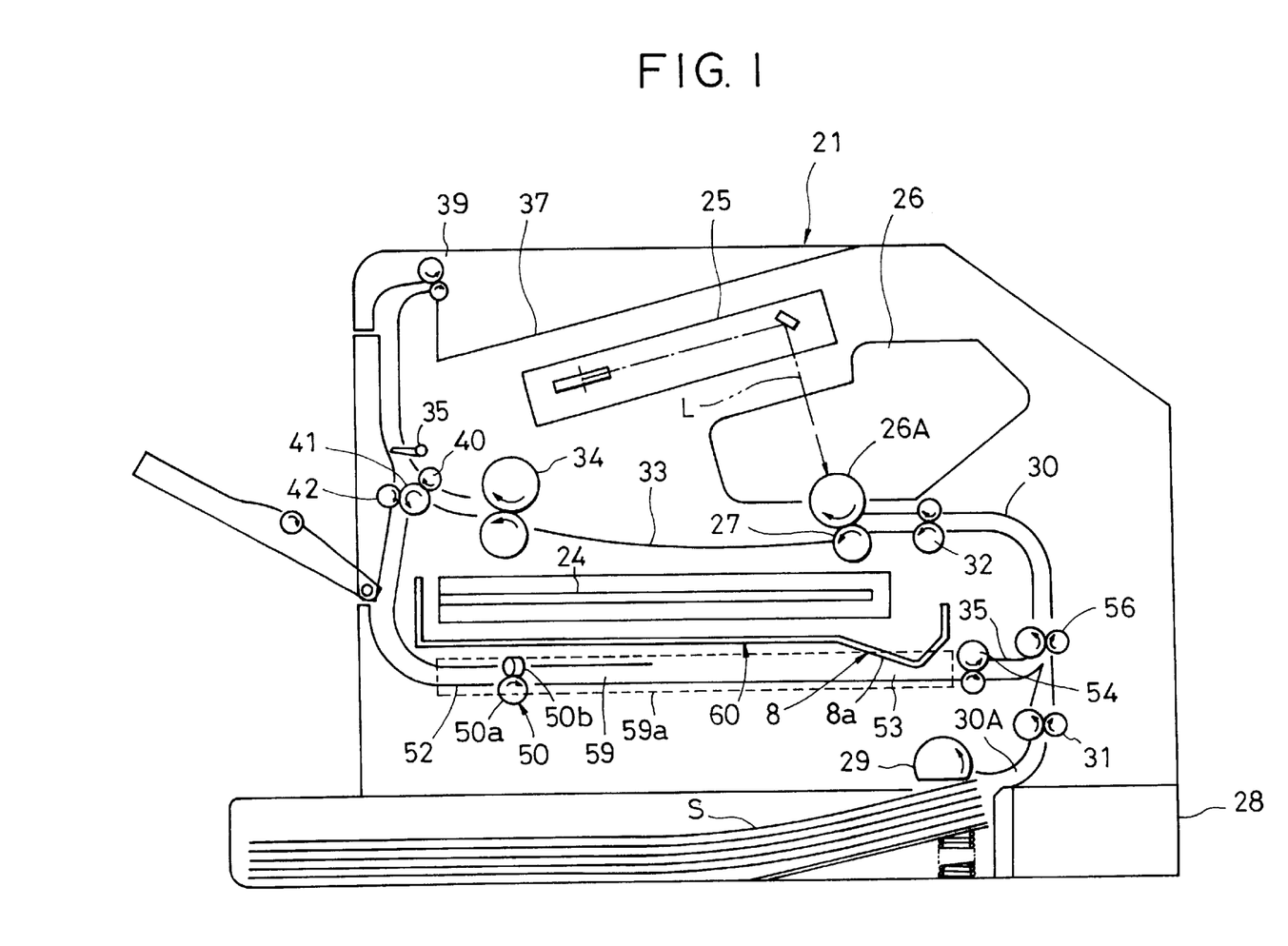
FIG. 1 is a vertical sectional view schematically showing the structure of a first embodiment of an image forming apparatus.

An embodiment of an image forming apparatus of the present invention is shown in FIG. 1. The image forming apparatus shown in FIG. 1 is an electrophotographic laser beam printer. FIG. 1 is a vertical sectional view schematically showing the structure thereof.

In a laser beam printer (hereinafter referred to as "the image forming apparatus") 21 shown in FIG. 1, based on information transmitted from an external information apparatus, such as a personal computer or a word processor, a video controller board (not shown), which serves as image-signal generating means, generates an image signal. In accordance with the image signal generated by the video controller board, a laser scanner 25 generates a laser beam L. The laser beam L illuminates the surface of a uniformly charged photosensitive drum 26A, which rotates clockwise in FIG. 1. The illumination causes the portions of an electrostatic latent image to be successively formed on the photosensitive drum 26A.

Portions of the electrostatic latent image which have been formed on the photosensitive drum 26A are successively made visible as portions of a toner image by toner that is supplied from a developing device (not shown) inside a process unit 26. Then, the toner image is transported to a transfer portion between the photosensitive drum 26A and a transfer roller 27.

A plurality of sheet materials S which are loaded and accommodated inside a sheet-feed cassette 28 are successively sent out one sheet material at a time from a topmost sheet material S into a sheet-feed path 30A by a half-moon-shaped sheet-feed roller 29 which is rotating counterclockwise. Then, by pairs of transporting rollers 31 and 56, the sheet materials S are transported along a transportation guide 30 to a pair of register rollers 32 which are not rotating.

After the front edge of a sheet material S which has reached the pair of register rollers 32 has entered the nip section between the pair of register rollers 32, the transportation of the sheet material S is continued until a predetermined loop of sheet material S is formed, so that an obliquely moving state of the sheet material S is corrected.

The sheet material S whose obliquely moving state has been corrected is transported to the transfer portion by the pair of register rollers 32 which start rotating at a timing in which the toner image on the photosensitive drum 26A and the position of the sheet material S is aligned. Here, by the transfer roller 27, the toner image on the photosensitive drum 26A is transferred onto a surface of the sheet material S. By transporting the sheet material S at this time, a sheet material detecting lever (not shown) detects the front edge of the sheet material S. After the sheet material S has passed by the sheet material detecting lever, the sheet material detecting lever next detects the position of the back edge of the sheet material S.

The sheet material S onto which the toner image has been transferred passes along a transportation guide 33 and is transported to a fixing device 34 where the toner image is fixed to the sheet material S by heating and application of pressure.

When a one-side image formation mode is selected at the image forming apparatus 21, the sheet material S onto which the toner image has been fixed is transported by a transporting roller 41 and a roller 40. After the front and back edges of the sheet material S have been detected by a sheet material detecting lever 35, the sheet material S is discharged onto a sheet-discharge tray 37 by a pair of sheet-discharge rollers 39. In this way, the toner image is formed on a first surface of the sheet material S.

On the other hand, when a duplex image formation mode is selected from, for example, an operation panel (not shown) disposed at the body of the image forming apparatus or an external information apparatus, the sheet detecting lever 35 detects a timing in which the back edge of the sheet material S onto which the toner image has been fixed moves out of a nip section between the transporting roller 41 and the roller 40. By this detection, the pair of sheet-discharge rollers 39 rotate in the opposite direction, causing the end portion of the sheet material S which has been until this time the back end portion to become the leading end portion. Then, the sheet material S in this state is transported towards the transporting roller 41. The transporting roller 41 is press-contacted by the rollers 40 and 42, and continues rotating in the direction of the arrows, so that the front edge of the sheet material S is transported towards the roller 42. Thereafter, the sheet material S is transported as it is to a sheet re-feed path 52 as a result of being nipped by the nip section between the roller 42 and the transporting roller 41.

A pair of diagonal feed rollers 50 is disposed in the sheet re-feed path 52, and comprises one transporting roller 50a and a diagonal feed roller 50b which is tilted by a proper amount with respect to the transporting roller 50a. In this embodiment, the axial center of the diagonal feed roller 50b is tilted slightly towards the right with respect to the axial center of the transporting roller 50a, that is, in a direction in which the sheet material S is transported slightly towards the right.

The sheet material S which has passed through the pair of diagonal feed rollers 50 is transported into a re-transportation path 59. An oblique movement correcting guide 59a is disposed in the re-transportation path 59. The oblique movement correcting guide 59a restricts the position of the right edge (in the direction of transportation) of the sheet material S in order to correct the oblique movement of the sheet material S that has been obliquely transported towards the right by the pair of diagonal feed rollers 50. While the right edge of the sheet material S contacts the oblique movement correcting guide 59a, the sheet material S is transported inside the re-transportation path 59, so that the oblique movement thereof is corrected.

A video controller board (electrical member) 24 is disposed above the re-transportation path 52. An electromagnetic shield plate 60 is provided between the video controller board 24 and the re-transportation path 59 so as to entirely cover the area below the video controller board 24. The electromagnetic shield plate 60 is disposed along the re-transportation path 52. The bottom surface of the electromagnetic shield plate 60 (that is, the surface of the electromagnetic shield plate 60 at the re-transportation path 52 side) is a sheet guiding surface (sheet guiding means) used for guiding the transportation of the sheet material S.

Figure 2:
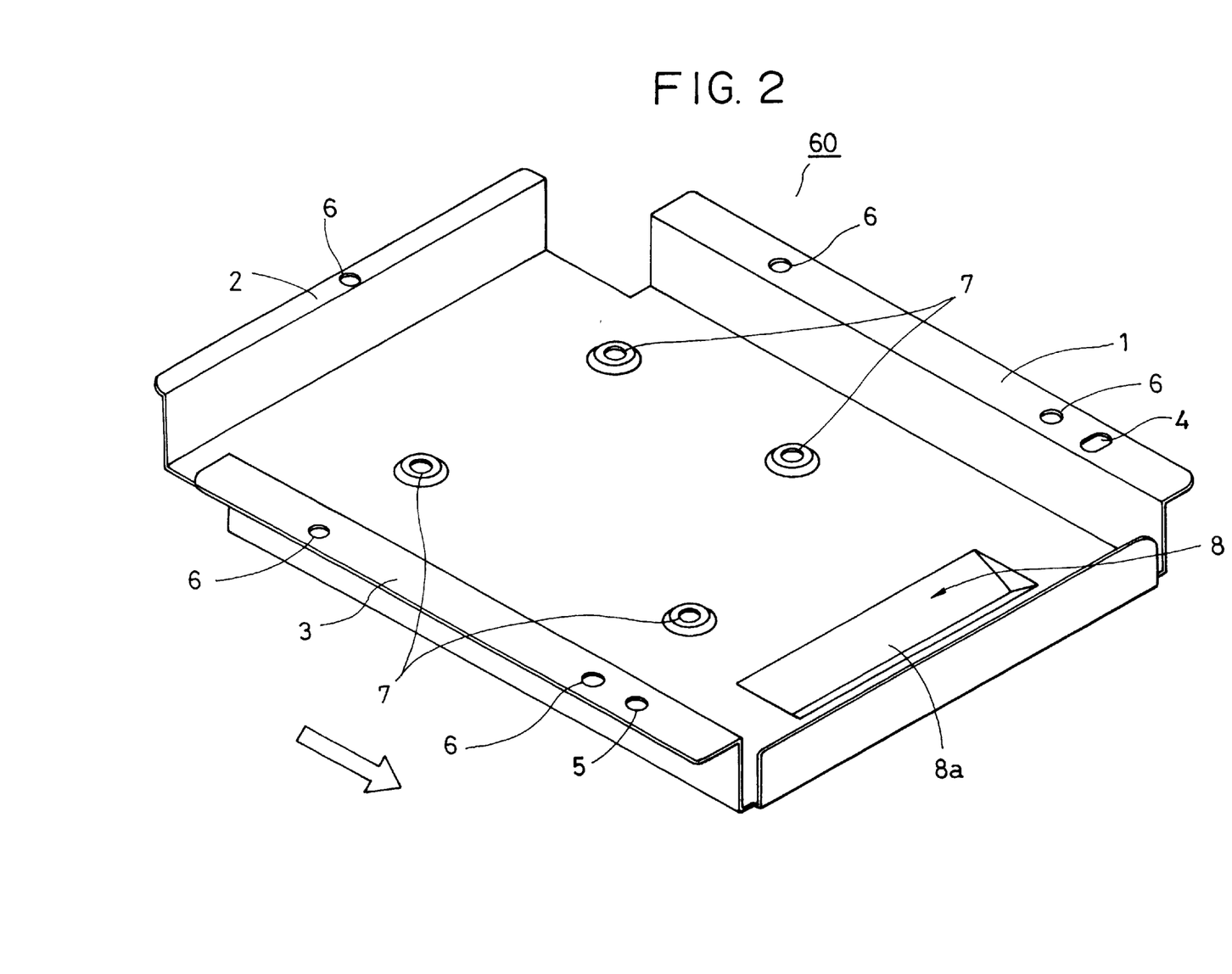
FIG. 2 is a perspective view of an electromagnetic shield plate used in the first embodiment.

As shown in FIG. 2 (perspective view), the whole electromagnetic shield plate 60 is integrally constructed as one member. In other words, the electromagnetic shield plate 60 is formed by bending or forming holes in a metallic plate material. The electromagnetic shield plate 60 shown in FIG. 2 is disposed so that its diagonally bottom right side is positioned at the downstream side along the direction in which the sheet material S is transported.

The electromagnetic shield plate 60 is formed by bending the four sides of a substantially rectangular plate material at an angle of approximately 90 degrees, and by further outwardly bending the edges of three of the four bent portions (that is, the bent portions except the one downstream-side bent portion) at an angle of approximately 90 degrees in order to form mounting portions 1, 2, and 3, which are used to mount the entire electromagnetic shield plate 60 to the body of the image forming apparatus (not shown). A suitable number of screw holes 6 are formed in each of the mounting portions 1, 2, and 3. Positioning holes 4 and 5 are further formed in the mounting portions 3 and 1, respectively. The positioning hole 5 is a perfectly circular hole, while the positioning hole 4 is a long hole.

Four bearing surfaces 7 used for mounting the video controller board 24 are formed in the center portion of the top surface of the electromagnetic shield plate 60 (that is, the surface of the electromagnetic shield plate 60 at the video controller board 24 side). Screw holes are provided in the top portions of the corresponding bearing surfaces 7.

A guide section 8 is formed at the downstream-side (in the sheet feeding direction as shown by the arrow) of the electromagnetic shield plate 60 by causing a portion of the electromagnetic shield plate 60 to protrude downward towards the re-transportation path 59. The guide section 8 is formed into a substantially triangular shape in vertical sectional view along the direction in which the sheet material S is transported. The guide section 8 is provided so as to extend on the left and right sides of the center of the sheet material S in the horizontal direction that is transported below the guide section 8. The horizontal length of the guide section 8 does not need to be equal to the overall width of the sheet material S. An inclined surface 8a is formed at the upstream-side portion of the guide section 8 so as to extend forward and downward in the downstream direction. Therefore, by the guide section 8, a transportation space of the re-transportation path 59 is made narrow in the vertical direction.

Accordingly, a portion of the re-transportation path 59 is made narrow in the vertical direction by the guide section 8. Therefore, even if, for example, the sheet material S is curled upward after the fixing operation, the front edge of the sheet material S is smoothly guided to a nip section between sheet re-feed rollers 54.

The guide section 8 is integrally formed with the electromagnetic shield plate 60, so that, compared to, for example, the case where a resin guiding member is formed as a separate member, the number of component parts and the number of manhours required for assembly can be reduced. In addition, since the parts gap 57 shown in FIG. 5 is not formed, the problem of the sheet material S getting caught and jammed in the parts gap 57 will not occur. Further, since the guide section 8 is formed of metal, unlike the case where it is formed of resin, the problem of the transportation of the sheet material S being prevented by static electricity caused by friction will not occur.

The guide section 8 used in this embodiment can be integrally molded when molding the electromagnetic shield plate 60 by, for example, a pressing operation.

Figure 3:
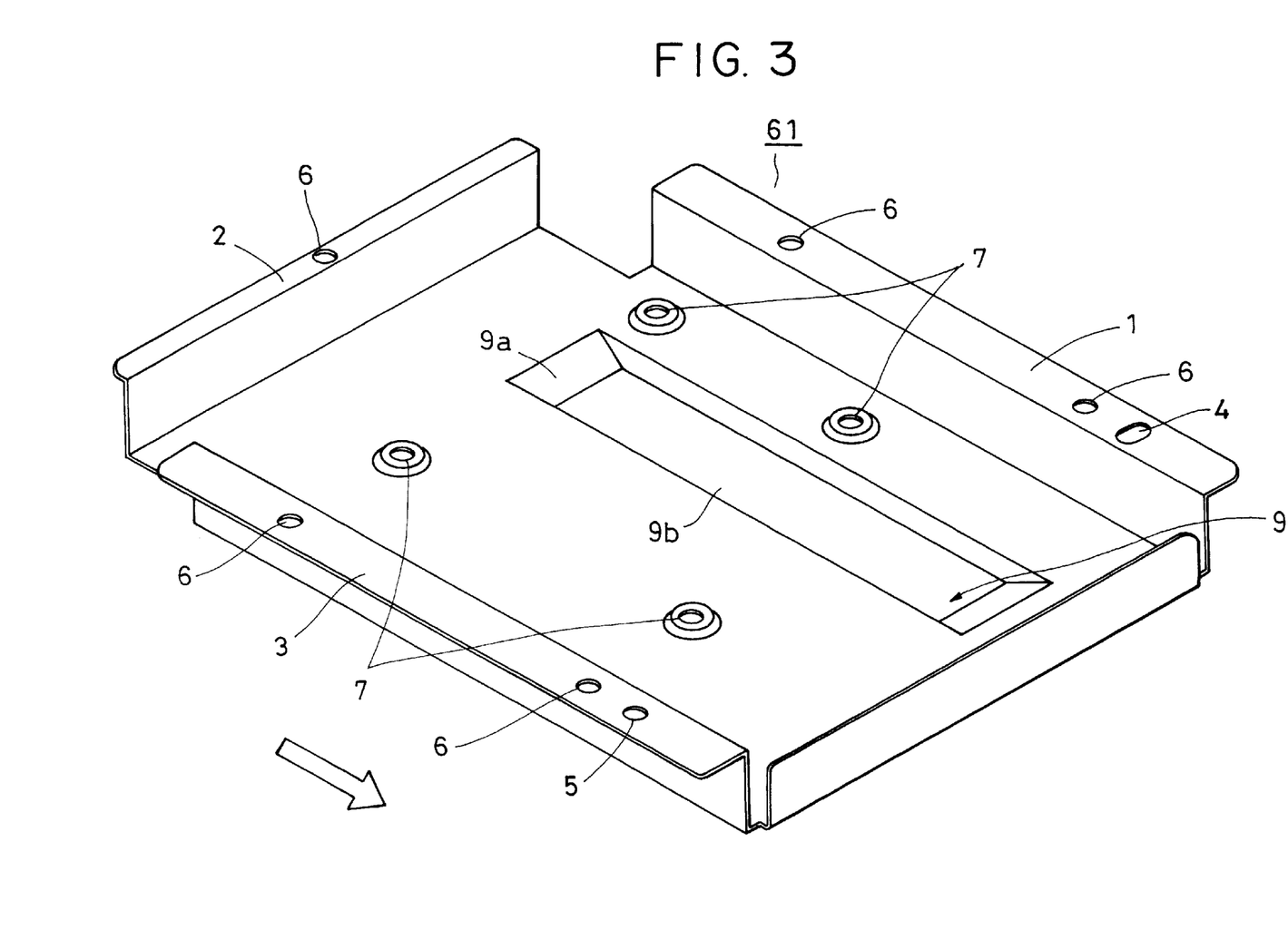
FIG. 3 is a perspective view of an electromagnetic shield plate used in a second embodiment.
Figure 4:
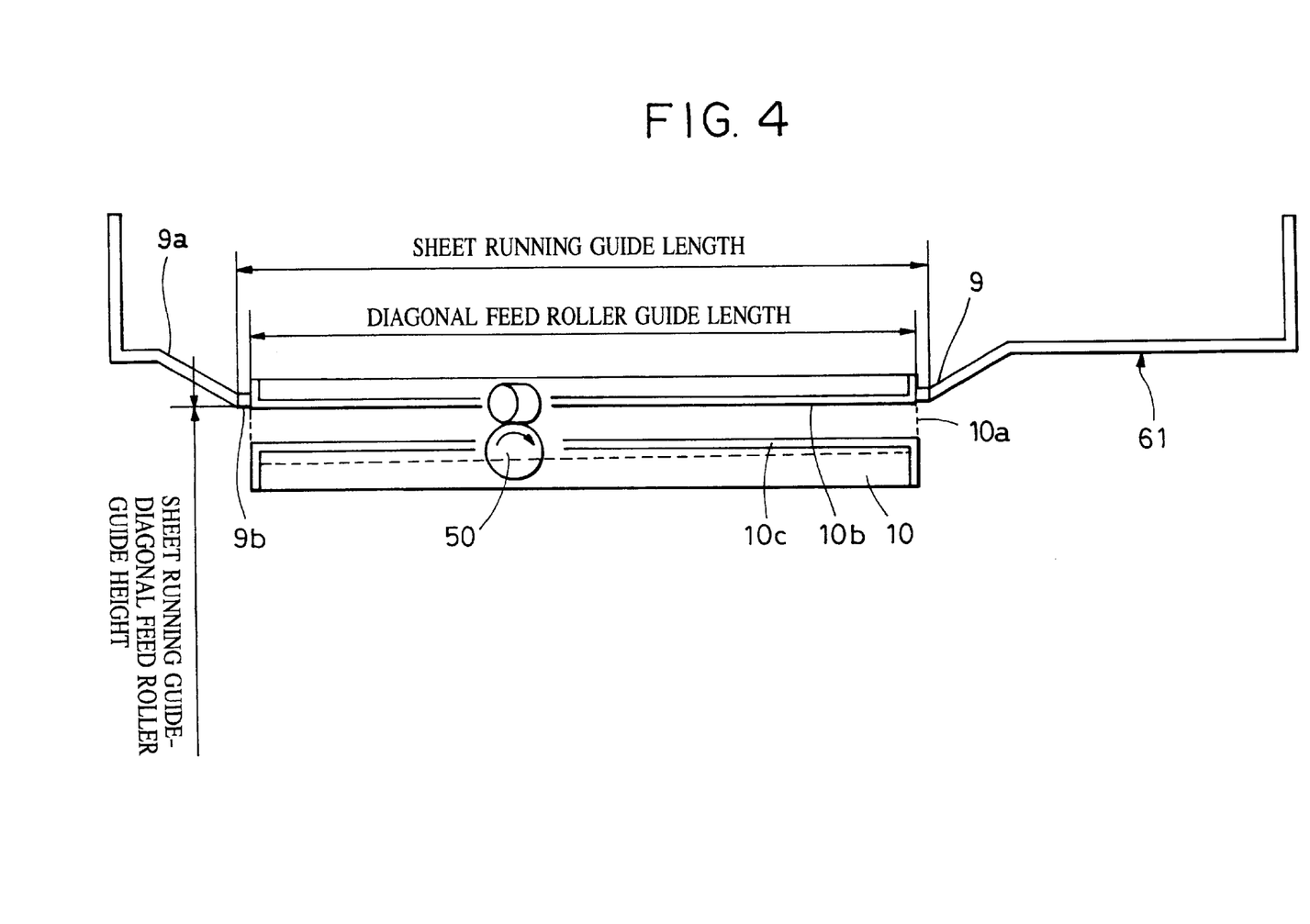
FIG. 4 illustrates the structure of the electromagnetic shield plate used in the second embodiment.

A description of a second embodiment of the present invention will be given with reference to FIGS. 3 and 4. FIG. 3 is a top perspective view of an electromagnetic shield plate 61. FIG. 4 illustrates the electromagnetic shield plate 61 viewed from the same direction as that from which the image forming apparatus 21 is viewed in FIG. 1.

In the second embodiment, a guide section 9 of the electromagnetic plate 61 is formed so that it is longest in the direction in which a sheet material S is transported. The guide section 9 includes an inclined surface 9a, which extends forward and downward into the sheet transport path in the sheet feeding direction (in the direction of the arrow in FIG. 3), and a curl straightening surface 9b (the surface along the re-transportation path 59), which is formed contiguously with the inclined surface 9a. In the second embodiment, the pair of diagonal feed rollers 50 are provided at a diagonal feed roller unit 10. The diagonal feed roller unit 10 comprises an oblique movement correcting guide 10a and upper and lower guides 10b and 10c, which guide a sheet material S in the vicinity of the oblique movement correcting guide 10a and which extend lengthwise in the direction in which the sheet material S is transported. The guide length (sheet running guide length) of a sheet material S due to the guide section 9 is substantially equal to the guide length of the diagonal feed roller unit 10 including the pair of diagonal feed rollers 50. The restriction height is such that the height-direction position of the curl straightening surface 9b (that is, the height of the bottommost portion of the curl straightening surface 9b) is substantially equal to the height of the topmost portion of the oblique movement correcting guide 10a of the diagonal feed roller unit 10.

By forming this structure, even when, for example, a sheet material S is transported with reference not to its center, but to one side thereof, it is possible to, while straightening the upwardly facing curl of the sheet material S passing inside the re-transportation path 59 by the curl straightening surface 9b, stabilize the oblique movement correction effects of the oblique movement correcting guide 59a and the pair of diagonal feed rollers 50.

Although, in the foregoing description, the electromagnetic shield plates 60 and 61 are described as being disposed at the re-transportation path 59 for a sheet material S, the present invention is not limited thereto, so that the electromagnetic shield plates 60 and 61 may be used by disposing them in any other commonly used transportation path. In that case, it is possible to provide the same advantages as those that are provided when they are disposed at the re-transportation path 59.

As described above, according to the present invention, it is possible to prevent increased costs and improper transportation, including jamming, of a sheet material.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims.

What is claimed is:

1. A sheet guiding device for guiding a sheet material, the sheet guiding device comprising:
    an electromagnetic shield plate which is disposed between an electrical member and a sheet transportation path, a sheet-transportation-path-side surface of the electromagnetic shield plate forming a sheet guiding surface for guiding the sheet material through a guiding section,
    wherein an integral portion of said electromagnetic shield plate protrudes into the sheet transportation path, thereby narrowing a height of the sheet transportation path.

2. A sheet guiding device according to claim 1, wherein the guiding section is metal.

3. A sheet guiding device according to claim 2, wherein the sheet transportation path is a sheet re-feed path for the sheet material, and wherein the sheet material which is re-fed is guided by the guide section.

4. A sheet guiding device according to claim 2, wherein said electromagnetic shield plate is disposed above the sheet transportation path, and wherein the sheet guiding surface restricts upward movement of the sheet material as it is transported in the sheet transportation path.

5. A sheet guiding device according to any one of claims 1 to 4, further comprising an oblique movement correcting guide which corrects an oblique movement of the sheet material by contacting a side edge of the sheet material which is being transported, wherein a guide length of the guiding section and a guide length of the oblique movement correcting guide are substantially equal to each other.

6. A sheet guiding device according to claim 5, wherein a bottommost portion of the guiding section and a topmost portion of the oblique movement correcting guide are at substantially equal vertical levels to each other.

7. An image forming apparatus comprising:
    an image forming section which forms an image on a surface of a sheet material;
    a sheet transportation path used to guide the sheet material upon which an image has been formed by the image forming section; and
    a sheet guiding device comprising an electromagnetic shield plate disposed between an electrical member and the sheet transportation path, a sheet-transportation-path-side surface of the electromagnetic shield plate forming a sheet guiding surface for guiding the sheet material through a guiding section, wherein the electromagnetic shield plate protrudes into the sheet transportation path, thereby narrowing a height of the sheet transportation path.

8. An image forming apparatus according to claim 7, wherein the guiding section is metal.

9. An image forming apparatus according to claim 8, wherein the sheet transportation path is a sheet re-feed path for the sheet material, and wherein the sheet material which is re-fed is guided by the guide section.

10. An image forming apparatus according to claim 8, wherein said electromagnetic shield plate is disposed above the sheet transportation path, and wherein the sheet guiding surface restricts upward movement of the sheet material as it is transported in the sheet transportation path.

11. An image forming apparatus according to any one of claims 7 to 10, further comprising an oblique movement correcting guide which corrects an oblique movement of the sheet material by contacting a side edge of the sheet material which is being transported, wherein a guide length of the guiding section and a guide length of the oblique movement correcting guide are equal to each other.

12. An image forming apparatus according to claim 11, wherein a bottommost portion of the guiding section and a topmost portion of the oblique movement correcting guide are at substantially equal vertical levels to each other.

13. An image forming apparatus comprising:
    image forming means for forming an image on the sheet material to be transported;
    an oblique movement correcting guide which restricts a side edge of a sheet material in a sheet transportation path;
    means for transporting the sheet from the image forming means and through the sheet transportation path while pushing the sheet against said oblique movement correcting guide;
    an electromagnetic shield plate which covers an electrical member, said electromagnetic shield plate having a front surface facing the electrical member and a back surface facing away from the electrical member, wherein the back surface of the electromagnetic shield plate is a first guiding surface which guides one of the surface sides of the sheet material as it is transported through the sheet transporting path; and
    a second guiding surface, which opposes the first guiding surface, for guiding the sheet, wherein the first guiding surface and the second guiding surface form the sheet transportation path between them and the first guiding surface has a protruding portion which protrudes towards the second guiding surface to thereby narrow the sheet transportation path formed between the first guiding surface and the second guiding surface.

14. An image forming apparatus according to claim 13, wherein the guiding section is metal.

15. An image forming apparatus according to claim 13, wherein the protruding portion is disposed so as to be tilted towards a side opposite to the oblique movement correcting guide in a widthwise direction of the sheet transportation path.

16. An image forming apparatus according to claim 13, wherein the protruding portion is provided so as to extend in a direction in which the sheet is transported.

17. An image forming apparatus according to claim 13, further comprising a unit including a pair of guiding members, disposed so as to extend in a direction in which the sheet is transported, for guiding both sides of the sheet in the vicinity of the oblique movement correcting guide, wherein the transporting means and the oblique movement correcting guide are provided at the unit.

* * * * *

UNITED STATES PATENT AND TRADEMARK OFFICE
CERTIFICATE OF CORRECTION

PATENT NO. : 6,618,577 B2  Page 1 of 1
DATED : September 9, 2003
INVENTOR(S) : Kinya Omura It is certified that error appears in the above-identified patent and that said Letters Patent is hereby corrected as shown below:

<u>Title page,</u>
Item [*] Notice, "0 days" should read -- 10 days --.

Signed and Sealed this

Twenty-seventh Day of January, 2004

JON W. DUDAS
*Acting Director of the United States Patent and Trademark Office*